United States Patent [19]
Kimbrell, Jr. et al.

[11] Patent Number: 5,899,783
[45] Date of Patent: May 4, 1999

[54] FLUID SHIELD FABRIC

[75] Inventors: William Carl Kimbrell, Jr., Spartanburg; Christopher Todd Usher, Greer, both of S.C.

[73] Assignee: Milliken & Company, Spartanburg, S.C.

[21] Appl. No.: 08/799,790

[22] Filed: Feb. 12, 1997

[51] Int. Cl.⁶ .................. D06M 13/08; D06M 15/21; D06M 15/507
[52] U.S. Cl. .................. 442/62; 442/82; 442/85; 442/86; 442/88; 442/92; 442/94; 442/164
[58] Field of Search .................. 442/62, 82, 85, 442/86, 88, 92, 94, 164

[56] References Cited

U.S. PATENT DOCUMENTS

| | | | |
|---|---|---|---|
| 3,557,039 | 1/1971 | McIntyre et al. | 260/29.2 |
| 4,256,459 | 3/1981 | Russell et al. | 8/471 |
| 4,291,082 | 9/1981 | Stall | 428/138 |
| 4,355,065 | 10/1982 | DeMott | 428/195 |
| 4,368,233 | 1/1983 | Barkis et al. | 428/245 |
| 4,469,744 | 9/1984 | Grot et al. | 428/246 |
| 4,610,918 | 9/1986 | Effenberger et al. | 428/245 |
| 4,666,764 | 5/1987 | Kobayashi et al. | 428/254 |
| 4,684,568 | 8/1987 | Lou | 428/265 |
| 4,919,998 | 4/1990 | Goad et al. | 428/265 |
| 5,071,699 | 12/1991 | Pappas et al. | 428/265 |
| 5,126,138 | 6/1992 | McGee et al. | 424/404 |
| 5,491,021 | 2/1996 | Tolliver et al. | 428/217 |
| 5,565,265 | 10/1996 | Rubin et al. | 428/265 |
| 5,645,892 | 7/1997 | Whitley et al. | 427/393.4 |
| 5,747,392 | 5/1998 | Xiao et al. | 442/82 |

*Primary Examiner*—Jenna Davis
*Assistant Examiner*—Jason Savage
*Attorney, Agent, or Firm*—Terry T. Moyer; James M. Robertson

[57] ABSTRACT

A fabric possessing both cleanability and fluid resistant properties is provided which can, if desired, be transfer printed. The fabric includes a textile substrate treated with a fluorochemical stain resist agent. The treated textile substrate is covered substantially on the back with a layer of extrusion coated thermoplastic polymer which is pressed at least partially into the fabric substrate. A process for forming the fluid shield fabric according to the present invention is also provided.

17 Claims, No Drawings

FLUID SHIELD FABRIC

FIELD OF THE INVENTION

The present invention relates to a fabric useful in upholstery applications and more particularly to a fabric having antimicrobial and stain resistant properties in combination with a fluid barrier coating suitable for transfer printing which does not adversely affect the tactile hand of the fabric. A method for forming such fabric is also provided.

BACKGROUND

Heretofore, a number of approaches have been taken to making fabrics both cleanable and liquid resistant so as to be more useful in environments where liquid staining is likely to occur. Vinyl coated fabrics have been most broadly accepted for these purposes due to relatively easy cleanability and fairly low cost. However, such vinyl coated fabrics are typically rather stiff to the touch and thereby lack the desired appearance and feel for use in environments such as restaurants, nursing homes, and the like where pleasing tactile and visual perceptions by the user are considered important. Surface laminated fabrics have been utilized to enhance the aesthetic characteristics of the fabrics, but due to the generally disjunctive adherence between the laminate film and the fabric itself, these products tend to peel, crack, and delaminate after long periods of use. Such laminated products also tend to lack the generally desirable feel of standard upholstery products.

Adherence of a liquid barrier film or coating to a fabric substrate is made all the more difficult when fluorochemical stain-resist treatments are applied, since such compositions by their nature tend to repel an applied coating.

The present invention overcomes these seemingly contradicting requirements of fluorochemically based stain resistance in combination with a strongly adherent fluid barrier shield through proper selection of the base textile material in combination with the selection of coating materials and application processes so as to permit a very thin layer (preferably less than 0.010 inches) of barrier material to be applied. Moreover, the actual material making up this barrier layer preferably possess dyeability and elastomeric properties which tend to conform substantially to those of the fabric substrate. The present invention therefore represents a useful advancement over present practices.

OBJECTS AND SUMMARY OF THE INVENTION

In light of the foregoing, it is a general object of the present invention to provide a fabric which possesses both stain resist and fluid barrier properties but which also exhibits a soft fabric hand as in traditional untreated upholstery fabrics where a soft fabric hand is understood to mean flexibility and/or lack of stiffness in the fabric itself.

It is a more particular object of the present invention to provide a fabric wherein a barrier coating of thermoplastic polymeric material including elastomeric components is adhered in stable relation to a fluorochemically treated surface.

It is yet a more particular object of the present invention to provide a fluid shield fabric useful in upholstery applications possessing a barrier coating of thermoplastic polymeric material in stable relation to a fluorochemically treated surface of a woven, knitted, or nonwoven fabric substrate.

Other objects, advantages and features of the present invention will, no doubt, occur to those skilled in the art upon reading of the following specification. Thus, while the invention will be described and disclosed in connection with certain preferred embodiments and procedures, it is by no means intended to limit the invention to such specific embodiments and procedures. Rather, it is intended to cover all such alternative embodiments, procedures, and modifications thereto as may fall within the true spirit and scope of the invention as defined only by the appended claims and equivalents thereto.

DESCRIPTION OF THE PREFERRED EMBODIMENTS

A fluid shield fabric is provided which may be dyed or transfer printed depending upon the specific process parameters utilized. In either case, the fabric exhibits a good hand while maintaining intimate adhesion between the base fabric and the polymeric barrier material despite the use of an intermediate fluorochemical composition.

In the potentially preferred practice of the present invention, a fabric substrate is treated with a fluorochemical stain resist agent and thereafter extrusion coated substantially on the back side (i.e. the surface which is not to undergo printing) with a layer of thermoplastic polymeric material so as to yield a final construction which exhibits both fluid and stain resistant properties.

The fabric substrate is preferably a woven material although it is contemplated that tightly formed knitted materials and/or nonwovens as are known to those of skill in the art may likewise be used if desired. Such fabric substrates are preferably formed from polyester yarns although it is contemplated that other materials including, by way of example only and not limitation, cotton-polyester blends, nylon, and polypropylene may also be utilized. It is believed that it is the intimate contact over a relatively large effective surface area as provided by the extrusion coating practice which permits the substantial physical adherence of the coating to the substrate even at low levels of polymer application.

In one particularly preferred embodiment, it has been found that the use of hairy type yarn in a woven fabric substrate permits good adhesion to be achieved between the fabric substrate and the polymeric material despite the occurrence of the fluorochemical stain resist agent when extrusion coating is used to force the polymeric material into the woven fabric substrate thereby effectively surrounding and covering such yarn. It has been further found that through use of a polymeric material which includes an elastomeric component therein, high degrees of flexibility can be achieved without the occurrence of delamination. Coating materials which may be used include by way of example only, polypropylene compositions, PET polyester compositions, PBT polyester compositions, elastomeric polyethylene and metallocene polyethylene compositions. The invention may be further understood and illustrated through reference to the following non limiting examples.

SPECIFIC EXAMPLE 1

The following example describes the preparation of fabric according to the present invention intended for dye application. A woven fabric having a weave density of about 68 ends per inch by 46 picks per inch was formed from two ply Albi-type textured polyester yarn to yield a 100% plain weave polyester woven fabric. It is to be understood that by the term Albi-type textured yarn is meant a textured yarn having a hairy surface made up of a number of raised fibrils. Such textured yarns are believed to be available from Milliken & Company having a place of business at 920 Milliken Road in Spartanburg, S.C.

The loom state fabric was thereafter scoured and heat set and passed through a jet dyeing machine so as to close the interstices between the individual yarns while at the same time enhancing the hairiness thereof. This jet dyeing treatment was performed with dye liquor present although such could be excluded if no coloration was desired. The fabric was thereafter padded on both sides with a solution containing about 1%–40% (about 6.6% preferred) of a fluorochemical such as MILLIGUARD™ BK 96 a fluoroacrylate copolymer emulsion from Milliken Chemical in Spartanburg, S.C.; about 0.5%–5.0% (about 3.0% preferred) ULTRA-FRESH™ NM; about 0.05%–1.0% (about 1.0% preferred) ULTRA-FRESH™ 40 available from Thompson Research; and about 1.0%–10.0% (about 2.0% preferred) ANTIBLAZE™ 19T (0.05–1.0%) flame retardant from Albright & Wilson with the remainder of the solution being made up of water.

While in the preferred practice, this solution will include both antimicrobial and flame retardant components, it is to be understood and appreciated that one or more of these additional components may be eliminated if desired. Following the padding application of this preparation solution, the fabric is cured at a temperature of about 225° F. to 425° F. preferably about 350° F. for 60 seconds. The woven fabric substrate with applied fluorochemical stain resist agent is thereafter heated to a temperature of about 90° to 410° F. (275° F. preferred) and passed to an extrusion coater.

As will be appreciated by those of skill in the art, extrusion coating involves the process of extruding a molten film from a die and contacting this molten film with the fabric substrate under pressure in the nip of two counter-rotating rolls. In the preferred practice, one of these rolls is a chill roll which is in contact with the surface being coated while the other roll is a deformable rubber material which is in contact with the side remaining uncoated. Through use of such a configuration, a layer of molten polypropylene is spread across and forced into the fabric which has undergone fluorochemical treatment. This molten polypropylene is preferably applied at a temperature of about 590° F. while the chill roll is preferably held at a temperature of about 75° F. One potentially preferred polypropylene composition is MONTELL KS084P from Montell Corporation in Wilmington, Del. which includes an elastomeric component therein. The line speed of the fabric itself is preferably about 100 feet per minute. This operation leads to a configuration wherein the polypropylene coating substantially covers and surrounds the yarn of the fabric over a large surface area so as to promote good mechanical adhesion. In addition, the coating material is pressed into the interstices which may still exist between the individual yarns so as to provide a barrier to fluid passage therebetween. In the preferred practice, the total thickness of the applied barrier layer is less than 0.010 inches, preferably less than 0.005 inches, most preferably 0.0005–0.002 inches.

SPECIFIC EXAMPLE 2

The following example describes the preparation of fabric according to the present invention which is intended for subsequent high temperature transfer printing. The procedures outlined in Example 1 were repeated in all respects except that a polyester copolymer was substituted for polypropylene as the coating material. PET or PBT based polyester copolymers may be utilized. As the fabrics are to be transfer printed, it is desirable for such polyester copolymers to have a relatively high melting point of at least about 375° F. Melting points of about 420° F. or greater may be preferred. One potentially preferred polyester is HYTREL™ polyester from E. I. DuPont de Nemours. This material includes an elastomeric component which permits the coating to effectively move with the fabric substrate. In practice, this material is extruded at a temperature of about 500° F. to 520° F. preferably 510° F. and the chill roll is maintained at a temperature of about 100° F. to 180° F. preferably 140° F.

It is contemplated that additional performance enhancing constituents may be incorporated within the thermoplastic polymeric materials which are extrusion coated onto the fabric substrate. These performance enhancing constituents may include, by way of example only and not limitation, antimicrobial compositions; flame retardants and/or ultraviolet stabilizing agents such as are known to those of skill in the art.

In light of the above disclosure of potentially preferred embodiments and processes, it will be appreciated that the general principal of invention disclosed herein may be applied in a variety of ways. Therefore, it is contemplated by the appended claims to cover any such modifications and other embodiment as incorporate the features of this invention within the broadest allowable scope thereof.

What is claimed is:

1. A fluid shield fabric comprising:
    a fabric substrate, a fluorochemical stain resist agent substantially covering said fabric substrate, and a layer of thermoplastic polymeric material substantially covering and pressed at least partially into said fabric substrate so as to provide a barrier layer against liquid passage, wherein said thermoplastic polymeric material is a polyester copolymer characterized by a melting point of not less than about 375° F.

2. The invention as in claim 1, wherein said fabric substrate is polyester.

3. The invention as in claim 1, wherein said fabric substrate is nylon.

4. The invention as in claim 1, wherein said fabric substrate is polypropylene.

5. The invention as in claim 1, wherein said fabric substrate is a woven fabric.

6. The invention as in claim 1, wherein said fabric substrate is a knit fabric.

7. The invention as in claim 1, wherein said fabric substrate is a nonwoven fabric.

8. The invention as in claim 1, wherein said fabric substrate comprises a plurality of yarn elements having raised fibrils extending therefrom.

9. The invention as in claim 1, further including a flame retarding agent disposed across said fabric substrate.

10. The invention as in claim 1, further including an antimicrobial agent disposed across said fabric substrate.

11. The invention as in claim 1, wherein said thermoplastic polymeric material includes a flame retarding agent disposed therein.

12. The invention as in claim 1, wherein said thermoplastic polymeric material includes an ultraviolet stabilizing agent disposed therein.

13. The invention as in claim 1, wherein said thermoplastic polymeric material includes an antimicrobial agent disposed therein.

14. The invention as in claim 1, wherein said layer of thermoplastic polymeric material has a thickness of about 0.010 inches or less.

15. The invention as in claim 14, wherein said layer of thermoplastic polymeric material has a thickness of about 0.005 inches or less.

16. The invention as in claim 15, wherein said layer of thermoplastic material has a thickness of about 0.0005 to about 0.003 inches.

17. A fluid shield fabric comprising:
   a fabric substrate, a fluorochemical stain resist agent substantially covering said fabric substrate, and a layer of thermoplastic polymeric material in overlaying relation to said fluorochemical stain resist agent covering said fabric substrate, said thermoplastic polymeric material at least partially penetrating the interstices of said fabric substrate so as to provide an effective barrier layer against liquid passage, wherein said fabric substrate is selected from the group consisting of:
   a) polyesters;
   b) cotton polyester blends;
   c) nylons; and
   d) polypropylenes
   and wherein said thermoplastic polymeric material is selected from the group consisting of:
   a) polypropylene;
   b) PET polyester;
   c) PBT polyester;
   d) polyethylene; and
   e) metallocene polyethylene.

* * * * *